US012592345B2

(12) United States Patent
Iguchi et al.

(10) Patent No.: US 12,592,345 B2
(45) Date of Patent: Mar. 31, 2026

(54) MULTILAYER CERAMIC ELECTRONIC DEVICE

(71) Applicant: TDK CORPORATION, Tokyo (JP)

(72) Inventors: Toshihiro Iguchi, Tokyo (JP); Shinya Saito, Tokyo (JP); Ayako Sato, Tokyo (JP); Yasuo Watanabe, Tokyo (JP); Takehisa Tamura, Tokyo (JP); Kenya Tamaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 194 days.

(21) Appl. No.: 18/324,344

(22) Filed: May 26, 2023

(65) Prior Publication Data

US 2023/0386748 A1      Nov. 30, 2023

(30) Foreign Application Priority Data

May 30, 2022      (JP) ................................. 2022-087874
Jan. 13, 2023      (JP) ................................. 2023-003846

(51) Int. Cl.
*H01G 4/30*          (2006.01)
*H01G 4/232*        (2006.01)

(52) U.S. Cl.
CPC ............. *H01G 4/2325* (2013.01); *H01G 4/30* (2013.01)

(58) Field of Classification Search
CPC .......... H01G 4/2325; H01G 4/30; H01G 4/12; H01G 4/232; H01G 4/248
See application file for complete search history.

(56) References Cited

U.S. PATENT DOCUMENTS

| | | | | |
|---|---|---|---|---|
| 2005/0184278 A1* | 8/2005 | Miki | ........................ | H01B 1/16 |
| | | | | 252/500 |
| 2013/0200749 A1* | 8/2013 | Nishisaka | ................ | H02N 2/00 |
| | | | | 336/200 |
| 2014/0292142 A1* | 10/2014 | Nishisaka | ................. | C03C 8/18 |
| | | | | 336/200 |
| 2019/0304694 A1* | 10/2019 | Iguchi | ................. | H01G 4/1245 |
| 2021/0027945 A1* | 1/2021 | Takahashi | ............ | H01G 4/2325 |
| 2021/0343475 A1* | 11/2021 | Takeuchi | ............. | H01G 4/1209 |

(Continued)

FOREIGN PATENT DOCUMENTS

| | | | | |
|---|---|---|---|---|
| JP | 2014209550 A | * 11/2014 | .............. | C03C 8/18 |
| JP | 2019-175938 A | 10/2019 | | |

(Continued)

*Primary Examiner* — Timothy J. Dole
*Assistant Examiner* — Esther N Lian
(74) *Attorney, Agent, or Firm* — OLIFF PLC.

(57) ABSTRACT

A multilayer ceramic electronic device includes an element body including a ceramic layer and an internal electrode layer, and an external electrode formed on an outer surface of the element body and electrically connected to part of the internal electrode layer. The external electrode includes a first layer in direct contact with the element body and containing a first insulator phase and first metal phases, and a second layer in contact with an outer surface of the first layer and containing a second insulator phase and second metal phases. An area ratio of the first metal phases in the first layer is more than 8% and 30% or less. An area ratio of the second metal phases in the second layer is larger than the area ratio of the first metal phases in the first layer. The first metal phases have an average aspect ratio of 3.5 or more.

9 Claims, 3 Drawing Sheets

(56) References Cited

U.S. PATENT DOCUMENTS

2022/0293344 A1 * 9/2022 Iguchi .................. H01G 4/1227
2023/0170105 A1 * 6/2023 Esaki ...................... H01B 1/22
                                                        252/520.3

FOREIGN PATENT DOCUMENTS

KR         20130090335 A  *  8/2013   .............. H01G 4/12
KR         20180038224 A  *  4/2018   ........... H01G 4/2325

* cited by examiner

MULTILAYER CERAMIC ELECTRONIC DEVICE

TECHNICAL FIELD

The present disclosure relates to a multilayer ceramic electronic device including external electrodes.

BACKGROUND

Multilayer ceramic electronic devices, such as multilayer ceramic capacitors (MLCCs), mounted on electronic circuits or power supply have a structure in which ceramic layers and internal electrode layers are alternately laminated. In these multilayer ceramic electronic devices, mechanical stress or a high voltage may cause a short circuit. Applying a current to the short-circuited multilayer ceramic electronic devices may generate heat from the multilayer ceramic electronic devices to heat a mounting substrate.

Patent Document 1 suggests a measure against such a problem to prevent generation of heat after a short circuit. Specifically, Patent Document 1 discloses a multilayer ceramic electronic device in which ceramic layers containing barium titanate and a predetermined subcomponent and internal electrode layers containing copper or silver as a main component are laminated. In the multilayer ceramic electronic device, insulation can be maintained even when a short circuit occurs, and generation of heat from its element body after the short circuit can be prevented.

Although the measure disclosed in Patent Document 1 optimizes the internal structure (e.g., compositions of the ceramic layers and the internal electrode layers) of the element body as mentioned above, a demand has been increasing for prevention of post-short circuit heat generation while degree of freedom in designing the element body is ensured, as a measure more versatile than that disclosed in Patent Document 1.

Patent Document 1: JP 2019175938 A

SUMMARY

The present disclosure has been achieved under such circumstances. It is an object of the disclosure to provide a multilayer ceramic electronic device capable of maintaining insulation after a short circuit.

To achieve the above object, a multilayer ceramic electronic device according to a first aspect of the present disclosure includes:

an element body including a ceramic layer and an internal electrode layer; and an external electrode formed on an outer surface of the element body and electrically connected to part of the internal electrode layer, wherein the external electrode includes a first layer in direct contact with the element body and containing a first insulator phase and first metal phases, and a second layer in contact with an outer surface of the first layer and containing a second insulator phase and second metal phases;

an area ratio of the first metal phases in the first layer is more than 8% and 30% or less;

an area ratio of the second metal phases in the second layer is larger than the area ratio of the first metal phases in the first layer; and the first metal phases have an average aspect ratio of 3.5 or more.

Through diligent consideration, the present inventors have found that the multilayer ceramic electronic device having the above characteristics can have insulation restoration properties. That is, the multilayer ceramic electronic device can maintain insulation even when the multilayer ceramic electronic device is energized after being short-circuited. Thus, in the multilayer ceramic electronic device according to the first aspect, generation of heat from the element body after a short circuit can be prevented.

Preferably, the area ratio of the first metal phases in the first layer is more than 8% and 18% or less.

Preferably, the first layer has an average thickness of 20 μm or more.

Preferably, a ratio of an average major diameter of the first metal phases to the average thickness of the first layer is 0.1 or more and 0.7 or less.

Preferably, the first insulator phase includes an oxide containing boron.

Preferably, the first metal phases include copper or silver.

Preferably, the external electrode further includes a plating electrode layer in contact with the second layer.

A multilayer ceramic electronic device according to a second aspect of the present disclosure includes:

an element body including a ceramic layer and an internal electrode layer; and an external electrode formed on an outer surface of the element body and electrically connected to part of the internal electrode layer, wherein the external electrode includes a first layer in direct contact with the element body and containing a first insulator phase and first metal phases, and a second layer in contact with an outer surface of the first layer and containing a second insulator phase and second metal phases;

an area ratio of the first metal phases in the first layer is more than 6% and 30% or less;

an area ratio of the second metal phases in the second layer is larger than the area ratio of the first metal phases in the first layer; and the first metal phases have an average aspect ratio of 5.0 or more.

Having the above characteristics, the multilayer ceramic electronic device according to the second aspect can maintain insulation even when the multilayer ceramic electronic device is energized after being short-circuited. Thus, in the multilayer ceramic electronic device according to the second aspect, generation of heat from the element body after a short circuit can be prevented.

BRIEF DESCRIPTION OF THE DRAWING(S)

DETAILED DESCRIPTION

Figure 1:
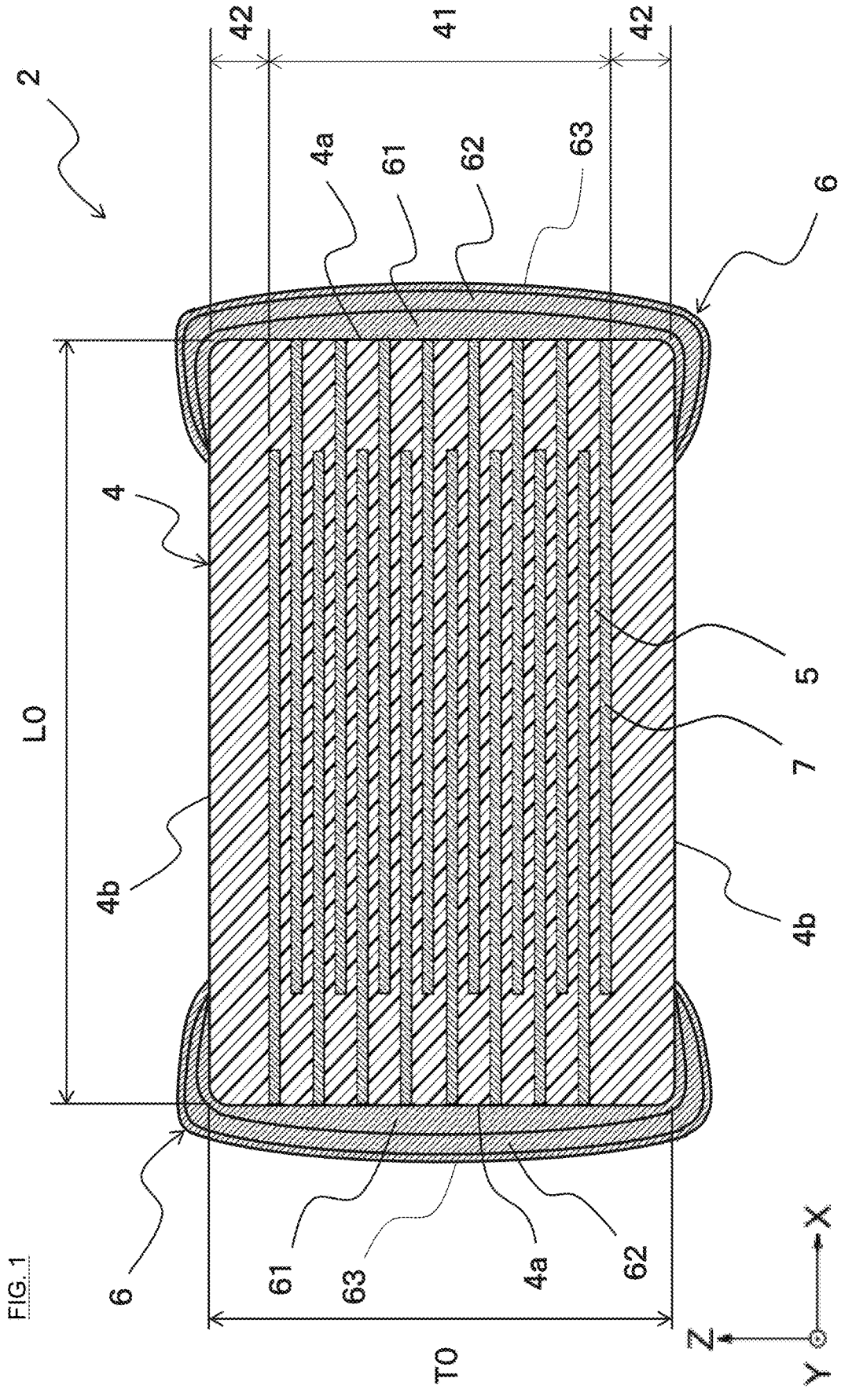
FIG. 1 is a sectional schematic view of a multilayer ceramic capacitor according to an embodiment of the present disclosure.

Hereinafter, the present disclosure will be described in detail based on an embodiment illustrated in the drawings.

In the present embodiment, a multilayer ceramic capacitor 2 shown in FIG. 1 is described as an example of a multilayer ceramic electronic device according to the present disclosure. The multilayer ceramic capacitor 2 includes an element body 4 and a pair of external electrodes 6 formed on outer surfaces of the element body 4.

The element body 4 shown in FIG. 1 normally has a substantially rectangular parallelepiped shape and includes two end surfaces 4a facing each other in the X-axis direction, two side surfaces 4b facing each other in the Y-axis direction, and two side surfaces 4b facing each other in the Z-axis direction. However, the element body 4 may have any other shapes, such as an elliptic cylinder shape, a cylindrical shape, and a prismatic shape. The element body 4 may have any external dimensions. For example, the element body 4 can have a length L0 of 0.2 mm to 5.7 mm in the X-axis direction, a width W0 of 0.1 mm to 5.0 mm in the Y-axis direction, and a height TO of 0.1 mm to 3.0 mm in the Z-axis direction. In the present embodiment, the X-axis, the Y-axis, and the Z-axis are perpendicular to each other.

The element body 4 includes ceramic layers 5 and internal electrode layers 7 substantially parallel to a plane containing the X-axis and the Y-axis. Inside the element body 4, the ceramic layers 5 and the internal electrode layers 7 are alternately laminated along the Z-axis direction. "Substantially parallel" means that the ceramic layers 5 and the internal electrode layers 7 are mostly parallel to the plane but may partly be slightly nonparallel. The ceramic layers 5 and the internal electrode layers 7 may slightly be uneven or inclined.

The ceramic layers 5 of the multilayer ceramic capacitor 2 include a dielectric compound as a main component. The main component of the ceramic layers 5 is a component that occupies 80 mol % or more of the ceramic layers 5. The dielectric compound as the main component may be made of any material. For example, the ceramic layers 5 can include, as the main component, a dielectric compound having a perovskite structure, such as $BaTiO_3$, $(Ca,Sr)TiO_3$, $(Ca,Sr)ZrO_3$, $(Ca,Sr)(Zr,Ti)O_3$, and $(K,Na)NbO_3$, or a dielectric compound having a tungsten bronze structure, such as $Ba_3ZrNb_4O_{15}$, $Ba_3TiNb_4O_{15}$, and $(K,Na)Sr_2Nb_5O_{15}$. The ceramic layers 5 may also include subcomponents, such as Si compounds, Al compounds, Mn compounds, Mg compounds, Cr compounds, Ni compounds, compounds containing at least one rare earth element, Li compounds, B compounds, V compounds, and Na compounds. The subcomponents included in the ceramic layers 5 are not limited to particular types, combinations, or content ratios.

Each ceramic layer 5 may have any average thickness (interlayer thickness). For example, the average thickness can be 100 μm or less and is preferably 10 μm or less. The number of the ceramic layers 5 is determined based on desired characteristics and may be any number. For example, the number of the ceramic layers 5 is preferably 20 or more and is more preferably 50 or more.

The internal electrode layers 7 are composed of a conductive material and may have any composition. For example, the internal electrode layers 7 can include Cu, Ni, Ag, Pd, Au, Pt, or an alloy containing at least one of these metal elements. When the main component of the ceramic layers 5 has resistance to reduction, the conductive material of the internal electrode layers 7 is preferably pure Ni or a Ni alloy containing at least 85 wt % Ni. The Ni alloy may include subcomponents, such as Cu, Cr, and Mn.

The internal electrode layers 7 may also include, as an inhibitor, particles of a dielectric compound having the same composition as the main component of the ceramic layers 5, in addition to the conductive material. The internal electrode layers 7 may further include a trace amount (e.g., about 0.1 mass % or less) of non-metal elements, such as S and P, and may also include a void. When the internal electrode layers 7 include the inhibitor, the void, or the like, the internal electrode layers 7 may be intermittent (the conductive material may be present intermittently).

Each of the internal electrode layers 7 is laminated between the adjacent ceramic layers 5, and the number of the internal electrode layers 7 is determined based on the number of the ceramic layers 5. Each internal electrode layer 7 may have any average thickness. For example, the average thickness is preferably 3.0 μm or less. The average thickness of the ceramic layers 5 and the average thickness of the internal electrode layers 7 are calculated by observing a cross section such as the one shown in FIG. 1 using a metallurgical microscope and measuring the thicknesses of the respective layers (5, 7) at least at five points.

The internal electrode layers 7 are laminated so that part of their ends is alternately exposed to the two end surfaces 4a of the element body 4. The pair of external electrodes 6 is formed on the end surfaces 4a of the element body 4 and is electrically connected to the exposed ends of the alternately arranged internal electrode layers 7. The internal electrode layers 7 and the external electrodes 6 formed in such a manner thus constitute a capacitor circuit.

The element body 4 includes a capacitance region 41 and exterior regions 42 laminated outwards from the capacitance region 41 in the lamination direction, as shown in FIG. 1. In the capacitance region 41, each of the ceramic layers 5 included in the region is sandwiched between the internal electrode layers 7 having different polarities, and a voltage can be applied to the ceramic layers 5. In contrast, in the exterior regions 42, only the ceramic layers 5 are laminated, and no internal electrode layers 7 are included.

Each of the external electrodes 6 integrally includes an end surface portion formed on the corresponding end surface 4a of the element body 4, and extended portions each formed at one end in the X-axis direction of the corresponding side surface 4b of the element body 4. That is, each of the external electrodes 6 is formed so as to extend from the corresponding end surface 4a to the corresponding side surfaces 4b of the element body 4. The external electrodes 6 are insulated from each other so as not to be in contact with each other in the X-axis direction. The extended portions of the external electrodes 6 are not necessarily formed, and it may be that each external electrode 6 includes only the end surface portion. Alternatively, when the multilayer ceramic capacitor 2 is to be surface-mounted on a substrate, the extended portions of the external electrodes 6 are formed at least on the side surface 4b facing a mounting surface of the substrate at the shortest distance and are not necessarily formed on the side surface 4b opposite the mounting surface.

In the multilayer ceramic capacitor 2 of the present embodiment, the external electrodes 6 having a predetermined structure allows the multilayer ceramic capacitor 2 to have insulation restoration properties. Hereinafter, the structure of the external electrodes 6 will be described in detail based on FIG. 2. Although FIG. 2 illustrates a cross section of only one external electrode 6, the other external electrode 6 has the same structure as that of the external electrode 6 shown in FIG. 2.

Figure 2:
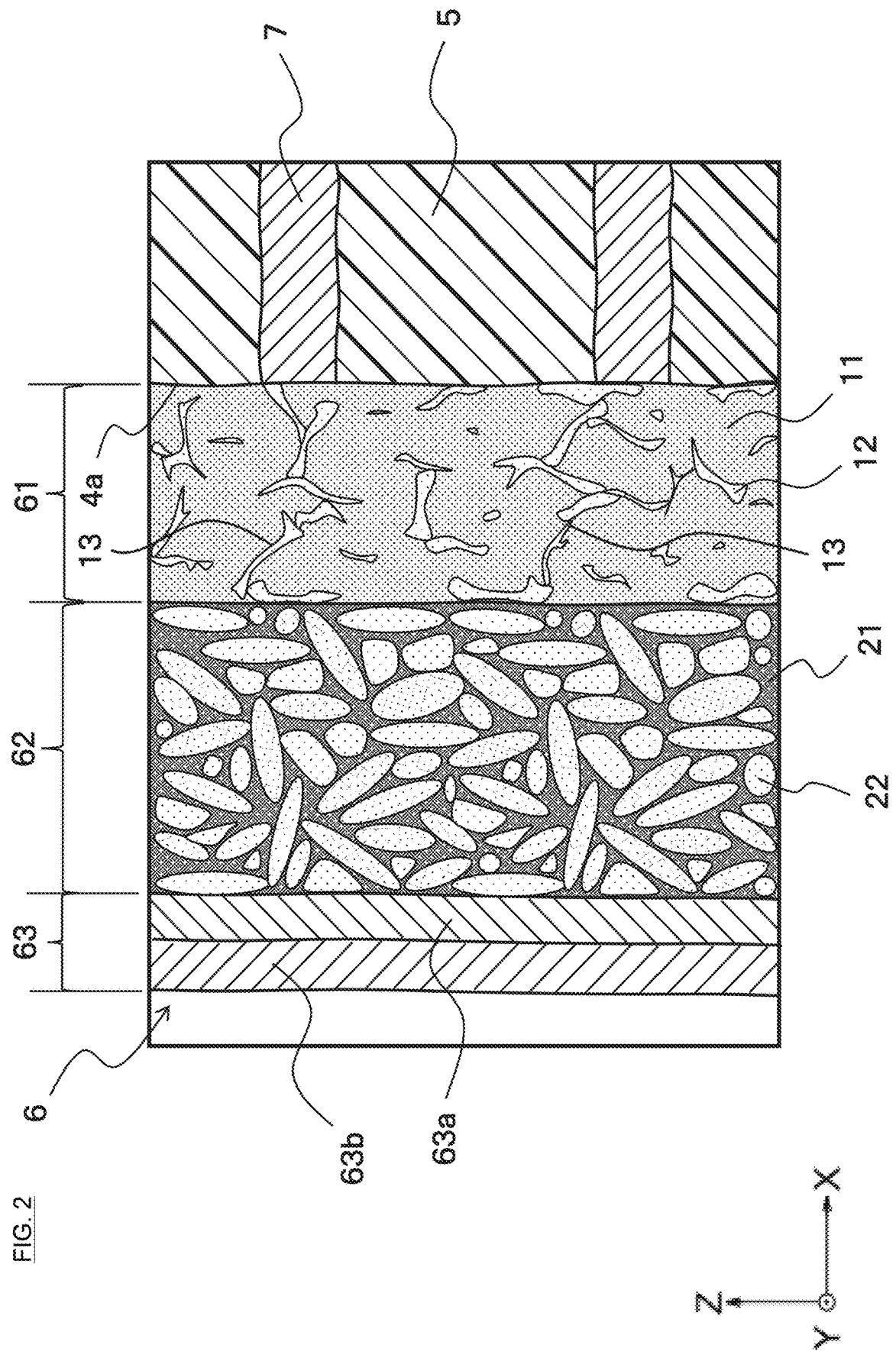
FIG. 2 is an enlarged sectional schematic view of an external electrode 6 shown in FIG. 1.

As shown in FIG. 2, the external electrode 6 has a multilayer structure and includes a first layer 61 and a second layer 62. The first layer 61 is in direct contact with the corresponding end surface 4a of the element body 4 where the internal electrode layers 7 are exposed, and no layer is present between the first layer 61 and the end surface 4a. The second layer 62 is located outwards from the first layer 61 and covers an outer surface of the first layer 61. The external electrode 6 preferably includes a plating electrode layer 63 located outwards from the second layer 62, in addition to the above-mentioned layers.

The first layer 61 is a sintered layer including a first insulator phase 11 and first metal phases 12 and has a structure in which the first metal phases 12 in a particulate form are dispersed in the first insulator phase 11. In the first layer 61, the volume ratio of the first metal phases 12 (conductor) is lower than that of the first insulator phase 11 (binding material). That is, the first layer 61 is a low-specific-gravity sintered electrode layer in which an insulating material occupies a higher proportion than a metal component.

The first insulator phase 11 can be composed of a ceramic material. The first insulator phase 11 preferably includes an oxide and more preferably includes an oxide containing boron. The "oxide containing boron" indicates $B_2O_3$ (boron trioxide) or a complex oxide containing boron. Still more preferably, the first insulator phase 11 is a complex oxide containing boron.

Examples of complex oxides containing boron (boron based complex oxides) include complex oxides containing $B_2O_3$ and one or more oxides selected from $SiO_2$, $Al_2O_3$, SrO, CaO, BaO, MgO, ZnO, $ZrO_2$, $TiO_2$, $V_2O_5$, $Na_2O$, and $K_2O$ (e.g., B—Si-alkali metal based complex oxides, B—Si—Zn-alkali metal based complex oxides, B—Si—K based complex oxides, and B—Si—Al based complex oxides). The complex oxide containing boron may have any composition ratio. For example, on the basis that the total amount of elements other than oxygen included in the complex oxide is 100 mol %, boron (B) accounts for preferably 10 mol % or more, and more preferably 20 mol % or more and 70 mol % or less, in the total amount (100 mol %).

Such a complex oxide containing boron (boron based complex oxide) readily vitrifies. In other words, the first insulator phase 11 is particularly preferably vitreous. Vitreousness of the boron based complex oxide allows for improvement of sinterability of the first layer 61. Vitreous boron based complex oxides are more fragile than crystalline oxides, and cracks 14 that cut conductive paths 13 (described later) readily appear in such vitreous boron based complex oxides.

The first metal phases 12 in the first layer 61 can include Ag, Cu, Ni, Pd, Au, Pt, or an alloy containing at least one of these metal elements. The first metal phases 12 preferably include Ag or Cu as a main component. More specifically, the main component of the first metal phases 12 is a metal element that accounts for 80 wt % or more of the first metal phases 12. The first metal phases 12 are preferably Ag particles, Cu particles, Ag alloy particles, or Cu alloy particles, and are more preferably Ag particles or Cu particles.

Components of the first insulator phase 11 and the first metal phases 12 can be analyzed with a wavelength dispersive X-ray spectrometer (WDS), energy dispersive X-ray spectroscopy (EDX), laser ablation ICP mass spectrometry (LA-ICP-MS), or the like.

The first metal phases 12 are not spherical particles and have a particulate shape with a large aspect ratio. Specifically, the first metal phases 12 have an average aspect ratio of at least 3.5, preferably 4.0 or more, and more preferably 5.0 or more. The larger the average aspect ratio of the first metal phases 12, the more readily the conductive paths 13

(described later) are formed. In other words, the average aspect ratio of the first metal phases 12 is in reciprocal proportion to the lower limit of the minimum required content ratio (area ratio) of the first metal phases 12 for formation of the conductive paths 13. The larger the average aspect ratio of the first metal phases 12, the less the lower limit of the content ratio of the first metal phases 12 can be. The average aspect ratio may have any upper limit.

An aspect ratio is a ratio of a major diameter to a minor diameter. The aspect ratio of each first metal phase 12 can be measured by observing a cross section, like the one shown in FIG. 2, of the first layer 61 with a scanning electron microscope (SEM), a scanning transmission electron microscope (STEM), or the like. Specifically, a sectional image of the first layer 61 is analyzed, and a minimum circumscribed rectangle of a particle (first metal phase 12) subject to measurement is drawn. The minimum circumscribed rectangle is a smallest quadrilateral that touches outer edges of the particle subject to measurement. The aspect ratio of the particle subject to measurement can be represented by LD/SD, where LD is the length (major diameter) of a long side of the minimum circumscribed rectangle and SD is the length (minor diameter) of a short side thereof. Preferably, such measurement is performed for at least twenty first metal phases 12 to calculate the average aspect ratio of the first metal phases 12.

The first metal phases 12 have an average major diameter $LD_{Ave}$ (i.e., average value of LDs) of preferably 2 μm or more and 20 μm or less, more preferably 5 μm or more and 15 μm or less, and still more preferably 5 μm or more and 11 μm or less.

The first layer 61 is a low-specific-gravity sintered electrode layer as previously mentioned, and the area ratio AM1 of the first metal phases 12 in the first layer 61 is more than 8% and 30% or less. However, the lower limit of the area ratio AM1 of the first metal phases 12 can be determined in accordance with the average aspect ratio of the first metal phases 12. Specifically, when the average aspect ratio of the first metal phases 12 is particularly large, i.e., 5.0 or more, the range of the area ratio AM1 can be widened to fall below the lower limit, and the area ratio AM1 of the first metal phases 12 in the first layer 61 can be more than 6% and 30% or less.

In the first layer 61, partial connection among adjacent first metal phases 12 forms the conductive paths 13 electrically connecting the internal electrode layers 7 and the second layer 62 (see FIG. 2). In contrast, when a short circuit occurs, application of a current to the short-circuited multilayer ceramic capacitor 2 causes the cracks 14 in the first layer 61 (see FIG. 3). It is assumed that the cracks 14 cut the conductive paths 13 to restore insulation of the multilayer ceramic capacitor 2 (insulation resistance becomes higher than that of the time immediately after the short circuit).

When the average aspect ratio of the first metal phases 12 is 3.5 or more and less than 5.0, setting the area ratio AM1 of the first metal phases 12 in the first layer 61 to more than 8% forms the conductive paths 13 at an appropriate ratio to give sufficient capacitance under normal conditions (conditions prior to a short circuit). When the average aspect ratio of the first metal phases 12 is 5.0 or more, setting the area ratio AM1 to more than 6% forms the conductive paths 13 at an appropriate ratio to give sufficient capacitance under normal conditions (conditions prior to a short circuit). Also, setting the area ratio AM1 to 30% or less can cut the conductive paths 13 after a short circuit. The area ratio AM1 preferably has an upper limit of 18% or less. Setting the area ratio AM1 to 18% or less more readily cuts the conductive paths 13 at the time of re-energization after a short circuit and can further improve the insulation restoration properties.

The area ratio AM1 of the first metal phases 12 in the first layer 61 can be calculated by analyzing a sectional image of the first layer 61 captured with a SEM or a STEM. Because metal part and non-metal part in a SEM image or a STEM image can be distinguished with contrast of lightness and darkness, binarization of the sectional image allows for measurement of the area $A_{M1}$ of the first metal phases 12 in a field of view subject to measurement. The area ratio AM1 of the first metal phases 12 can be represented by $A_{M1}/A_{E1}$ (%), where $A_{E1}$ is the area of the first layer 61 in the sectional image. Preferably, the above measurement is carried out at least at five fields of view to calculate the area ratio AM1 as their average.

As shown in FIG. 1, the first layer 61 preferably has a thickness that increases towards a near-center of the end surface 4a from near-edges of the end surface 4a. When the multilayer ceramic capacitor 2 is cut along an X-Z plane substantially at a center in the Y-axis direction to measure the thickness of the first layer 61, the thickness of the first layer 61 is more preferably the largest at a near-center in the Z-axis direction. Although t1a/t1b may have any value, where t1a is the maximum thickness of the first layer 61 at a location where the first layer 61 and the capacitance region 41 is in contact and t1b is the maximum thickness of the first layer 61 at a location where the first layer 61 and either exterior region 42 are in contact, the value is preferably, for example, 2.5 to 10.

When a high voltage is applied to the multilayer ceramic capacitor 2, adjacent internal electrode layers 7 may be short-circuited via the ceramic layers 5. Such a short circuit readily occurs at a near-center of the element body 4. By increasing the thickness of the first layer 61 at the near-center where short circuits readily occur, the cracks 14 are more readily caused at the near-center, allowing for further improvement of the insulation restoration properties.

At the time of calculation of the average thickness $t1_{Ave}$ of the first layer 61, the thickness of the first layer 61 is measured along the Z-axis direction at regular intervals in a cross section like the one shown in FIG. 1. Intervals at which the thickness is measured are preferably $\{(1/5) \times T0\}$ or less, where T0 is the height of the element body 4 in the Z-axis direction. The average thickness $t1_{Ave}$ of the first layer 61 is preferably 15 μm or more, and more preferably 20 μm or more. Although $t1_{Ave}$ may have any upper limit, $t1_{Ave}$ is, for example, preferably 50 μm or less and more preferably 30 μm or less.

A ratio $(LD_{Ave}/t1_{Ave})$ of the average major diameter $LD_{Ave}$ of the first metal phases 12 to the average thickness $t1_{Ave}$ of the first layer 61 is preferably 0.1 or more and 0.7 or less, and more preferably 0.18 or more and 0.50 or less. Setting $LD_{Ave}/t1_{Ave}$ within the above-mentioned range allows for more favorable compatibility between initial capacitance and insulation restoration properties.

The first layer 61 may include a void or the like in addition to the first insulator phase 11 and the first metal phases 12.

The second layer 62 is a sintered electrode layer or a resin electrode layer (preferably the latter) and includes a second insulator phase 21 and second metal phases 22. When the second layer 62 is a sintered electrode layer, the second insulator phase 21 is composed of a ceramic material and preferably includes an oxide or a complex oxide. More specifically, when the second layer 62 is a sintered electrode layer, the second insulator phase 21 preferably includes one or more oxides selected from $B_2O_3$, $SiO_2$, $Al_2O_3$, SrO, CaO, BaO, MgO, ZnO, $ZrO_2$, $TiO_2$, $V_2O_5$, $Na_2O$, and $K_2O$ and more preferably includes, similarly to the first insulator phase 21, a boron based complex oxide. In contrast, when the second layer 62 is a resin electrode layer, the second insulator phase 21 is composed of a resin material and includes preferably a thermosetting resin (e.g., an epoxy resin, a phenol resin, a melamine resin, a silicone resin, a urea resin, a furan resin, an alkyd resin, a polyester resin, and a diallyl phthalate resin) and more preferably an epoxy resin in terms of excellent heat resistance, moisture resistance, and adhesion.

The second metal phases 22 can include Cu, Ni, Ag, Pd, Au, Pt, or an alloy containing at least one of these metal elements. Similarly to the first metal phases 12, the second metal phases 22 preferably include Cu or Ag as a main component. That is, the second metal phases 22 are metal phases preferably containing Cu, Ag, a Cu alloy, or a Ag alloy and more preferably containing Cu or Ag. When the second metal phases 22 are alloy phases, Cu or Ag is preferably included at 80 wt % or more in the second metal phases (100 wt %).

The second metal phases 22 in the second layer 62 may have any form and can be, for example, spherical particles, long spherical particles, needle-shaped particles, or flat particles. The second metal phases 22 may be composed of spherical particles and particles having a large aspect ratio (e.g., 2.0 or more). When the second layer 62 is a sintered electrode layer, the second metal phases 22 may have a form in which adjacent metal particles are connected. In this case, in a cross section of the second layer 62, the second metal particles 22 may be connected in a manner such that individual particle shapes cannot be visually recognized.

When a particulate form of the second metal phases 22 is maintained in the cross section of the second layer 62, the second metal phases 22 observed in the cross section may have any average equivalent circular diameter. For example, the average equivalent circular diameter can be 0.5 μm to 15 μm and is preferably 3 μm to 10 μm. Equivalent circular diameters of the second metal phases 22 are measured by analyzing a sectional image of the second layer 62 captured with a SEM or a STEM. Preferably, equivalent circular diameters of at least ten second metal phases 22 are measured to calculate their average.

The area ratio of the second metal phases 22 in the second layer 62 is larger than that of the first metal phases 12 in the first layer 61, and electrical resistance of the second layer 62 is lower than that of the first layer 61. For example, the area ratio of the second metal phases 22 in the second layer 62 can be 70% or more and is preferably 80% to 95%. A ratio (AM2/AM1) of AM2 to AM1, where AM1(%) is the area ratio of the first metal phases 12 in the first layer 61 and AM2(%) is the area ratio of the second metal phases 22 in the second layer 62, is preferably, for example, 2 to 10. Because the content ratios of the metal components are different between the first layer 61 and the second layer 62 of the external electrode 6 in such a manner, a clear boundary is formed between the first layer 61 and the second layer 62.

When the multilayer ceramic capacitor 2 is mounted on a substrate, a joining member such as solder or conductive adhesive is used. To prevent reaction between the metal components included in the external electrode 6 and solder or to improve wettability of the joining member with respect to the external electrode 6 or bondability between the external electrode 6 and the joining member, the plating electrode layer 63 is preferably formed as an outermost layer of the external electrode 6. However, because the content ratio of the metal component of the first layer 61 is low, it is not easy to form the plating electrode layer 63 directly on the first layer 61. When the plating electrode layer 63 is formed directly on the first layer 61, plating defects readily occur. In the present embodiment, forming the second layer 62 having a high metal component ratio outwards from the first layer 61 allows for prevention of plating defects at the time of formation of the plating electrode layer 63 and provision of sufficient capacitance under normal conditions (conditions prior to a short circuit).

Similarly to the area ratio of the first metal phases 12, the area ratio of the second metal phases 22 is calculated by analyzing a sectional image of the second layer 62 captured with a SEM or a STEM. In other words, the area ratio AM2 of the second metal phases 22 can be represented by $A_{M2}/A_{E2}$(%), where $A_{E2}$ is the area of the second layer 62 in the sectional image and $A_{M2}$ is the area of the second metal phases 22 included in $A_{E2}$. Preferably, the above measurement is carried out at least at five fields of view to calculate the area ratio AM2 of the second metal phases 22 as the average.

The second layer 62 covers the first layer 61 and may have any thickness. For example, the second layer 62 can have an average thickness $t2_{Ave}$ of 5 μm to 150 μm and preferably has an average thickness $t2_{Ave}$ of 10 μm to 100 μm.

The second layer 62 may include a void or the like in addition to the second insulator phase 21 and the second metal phases 22.

The plating electrode layer 63 may be a single layer or may have a structure in which a plurality of plating layers is laminated. In particular, the plating electrode layer 63 preferably includes a Ni plating layer 63a and a Sn plating layer 63b. In this case, the Ni plating layer 63a is preferably in contact with an outer surface of the second layer 62, and the Sn plating layer 63b is preferably located as an outermost layer of the external electrode 6. Locating the Sn plating layer 63b as the outermost layer of the external electrode 6 improves wettability of the external electrode 6 with respect to solder. Presence of the Ni plating layer 63a under the Sn plating layer 63b allows the Ni plating layer 63a to function as a barrier layer to prevent penetration of a joining member (e.g., solder) for substrate mounting into the external electrode 6 or reaction between the joining member and the metal components of the external electrode 6.

The Ni plating layer 63a may be a pure Ni layer or an alloy layer containing Ni. The Ni plating layer 63a may contain Ni at any content ratio. For example, the content ratio is preferably 80 wt % or more. The Sn plating layer 63b may be a pure Sn layer or an alloy layer containing Sn. The Sn plating layer 63b may contain Sn at any content ratio. For example, the content ratio is preferably 80 wt % or more. The plating electrode layer 63 including the Ni plating layer 63a and the Sn plating layer 63b may include components other than metal. However, the content ratio (area ratio) of the metal components in the plating electrode layer 63 is preferably higher than the content ratio (area ratio AM2) of the second metal phases 22 in the second layer 62.

The Ni plating layer 63a and the Sn plating layer 63b may have any thickness. For example, the Ni plating layer 63a preferably has an average thickness of 1 μm to 20 μm, and the Sn plating layer 63b preferably has an average thickness of 1 μm to 20 μm.

A method of manufacturing the multilayer ceramic capacitor 2 shown in FIG. 1 is described next.

First, a dielectric paste and an internal electrode paste are prepared. The dielectric paste can be manufactured by adding a dielectric raw material powder and a subcomponent powder to a known organic vehicle or a known water based vehicle and kneading them. To the dielectric paste, a dispersant, a plasticizer, glass frit, or the like may be added in addition to the above-mentioned material. The internal electrode paste can be manufactured by adding a conductive powder to a known organic vehicle or a known water based vehicle and kneading them. To the internal electrode paste, a dielectric raw material powder may be added as an inhibitor, and a dispersant, a plasticizer, or the like may also be added.

Next, the dielectric paste is turned into sheets by, for example, a doctor blade method to give ceramic green sheets. The internal electrode paste is then applied onto the ceramic green sheets in a predetermined pattern by a printing method (e.g., screen printing) or a transfer method. The green sheets with the internal electrode patterns are laminated and then pressed in the lamination direction to give a mother laminated body. At this time, the ceramic green sheets and the internal electrode patterns are laminated so that the ceramic green sheets are located at an uppermost surface and a lowermost surface of the mother laminated body in the lamination direction.

The mother laminated body given by the above-mentioned process is cut into a predetermined size by dicing or push-cutting to give green chips. If necessary, the green chips may be subjected to solidification drying so that the plasticizer and the like are removed, and may then be subjected to barrel polishing using a horizontal centrifugal barrel machine or the like. In barrel polishing, the green chips are put into a barrel together with media and a polishing liquid, and a rotational movement and/or vibration is applied to the barrel. By such barrel polishing, unwanted parts (e.g., burrs generated during cutting) are removed, and the corners of the green chips are rounded. The green chips after barrel polishing are washed with a cleaning solution (e.g., water) and dried. Barrel polishing may be performed after the green chips are fired.

Next, the green chips given in the above-mentioned manner are subjected to a binder removal treatment, a firing treatment, and an annealing treatment (reoxidation) to give the element bodies 4.

Conditions of the binder removal treatment are appropriately determined in accordance with the types of the binders added to the dielectric paste and the internal electrode paste and are not limited. For example, the heating rate is preferably 5 to 300° C./hour; the holding time is preferably 180 to 400° C.; and the temperature holding time is preferably 0.5 to 24 hours. The binder removal atmosphere can be a normal air atmosphere (i.e., air) or a reducing atmosphere and is preferably air.

Conditions of the firing treatment are appropriately determined in accordance with the main component compositions of the ceramic layers 5 and the internal electrode layers 7 and are not limited. For example, the holding temperature during firing is preferably 1200 to 1350° C. and is more preferably 1220 to 1300° C.; and the holding time during firing is preferably 0.5 to 8 hours and is more preferably 1 to 3 hours. The firing atmosphere is preferably a reducing atmosphere. The ambient gas can be, for example, a humidified mixed gas of $N_2$ and $H_2$. When the internal electrode layers 7 are made of a base metal (e.g., Ni and a Ni alloy), the oxygen partial pressure in the firing atmosphere is preferably $1.0 \times 10^{-14}$ MPa to $1.0 \times 10^{-10}$ MPa.

The annealing treatment is not an essential step. However, when the firing treatment has been carried out in a reducing atmosphere, annealing is preferably performed to reoxidize the ceramic layers 5. Annealing conditions are appropriately determined in accordance with, for example, the main component composition of the ceramic layers 5 and are not limited. For example, the holding temperature is preferably 650 to 1150° C.; the temperature holding time is preferably 0 to 20 hours; and the heating rate and the cooling rate are preferably 50 to 500° C./hour. The ambient gas is preferably, for example, a dried $N_2$ gas or a humidified $N_2$ gas.

In the binder removal treatment, the firing treatment, and the annealing treatment, for example, a wetter is used to humidify gases, such as the $N_2$ gas and the mixed gas. In this case, the water temperature is preferably about 5 to 75° C. The binder removal treatment, the firing treatment, and the annealing treatment may be performed consecutively or independently.

Next, the pair of external electrodes 6 is formed on the outer surfaces of each element body 4 given above. Specifically, the first layer 61 can be formed by applying a first conductive paste to the end surfaces of the element body 4 and baking it. The first conductive paste is manufactured by kneading a metal raw material powder of the first metal phases 12, a raw material powder (preferably glass frit of a boron based complex oxide) of the first insulator phase 11, a binder, and a solvent. The average aspect ratio and the average diameter (average major diameter) of the first metal phases 12 can be controlled in accordance with shapes and sizes of the particles of the metal raw material powder. The area ratio AM1 of the first metal phases 12 can be controlled in accordance with the mixing ratio of the metal raw material powder included in the first conductive paste.

Any method of applying the first conductive paste may be used. For example, a dipping method or various printing methods can be used. The thickness of the first layer 61 can be controlled in accordance with the amount of the first conductive paste applied. As for conditions of baking the first conductive paste, for example, the holding temperature is preferably 700° C. to 900° C., and the temperature holding time is preferably 1 to 60 minutes.

After the first layer 61 is formed, the second layer 62 is formed with a second conductive paste. When the second layer 62 is a sintered electrode layer, the second conductive paste is manufactured by kneading a raw material powder (preferably glass frit, more preferably glass frit of a boron based complex oxide) of the second insulator phase 21, a metal raw material powder of the second metal phases 22, a binder, and a solvent. Similarly to the first conductive paste, the second conductive paste is applied to the outer surface of the first layer 61 by the dipping method or various printing methods and is baked to form the second layer 62. When the second layer 62 is a sintered electrode layer, it may be that the first conductive paste applied to the end surfaces 4a are dried, then the second conductive paste is applied on the dried first conductive paste, and the first layer 61 and the second layer 62 are sintered simultaneously.

When the second layer 62 is a resin electrode layer, the second conductive paste is manufactured by kneading a resin material (preferably a thermosetting resin, such as an epoxy resin) which is a raw material of the second insulator phase 21, a metal raw material powder of the second metal phases 22, and a solvent. In this case, the second layer 62 is formed by applying the second conductive paste including the resin material on the first layer 61 and then heating the element body 4 to harden the resin (the second insulator layer 21).

The content ratio (area ratio AM2) of the second metal phases 22 in the second layer 62 can be controlled in accordance with the mixing ratio of the metal raw material powder included in the second conductive paste. The thick-ness of the second layer 62 can be controlled in accordance with the amount of the second conductive paste applied.

After the second layer 62 is formed, the plating electrode layer 63 (63a and 63b) is formed by a known plating method. The above process gives the multilayer ceramic capacitor 2 including the external electrodes 6.

Summary of Embodiment

The multilayer ceramic capacitor 2 of the present embodiment includes the element body 4 including the ceramic layers 5 and the internal electrode layers 7, and the external electrodes 6 formed on the outer surfaces of the element body 4. Each external electrode 6 includes the first layer 61, which is in direct contact with the corresponding end surface 4a of the element body 4 and includes the first insulator phase 11 and the first metal phases 12, and the second layer 62, which is in contact with the outer surface of the first layer 61 and includes the second insulator phase 21 and the second metal phases 22. The average aspect ratio of the first metal phases 12 in the first layer 61 is 3.5 or more, and the area ratio AM1 of the first metal phases 12 in the first layer 61 is more than 8% and 30% or less. The area ratio AM2 of the second metal phases 22 in the second layer 62 is larger than AM1.

When the average aspect ratio of the first metal phases 12 in the first layer 61 is large, i.e., 5.0 or more, the range of the area ratio AM1 of the first metal phases 12 can be widened to more than 6% and 30% or less.

In the multilayer ceramic capacitor 2 having the above-mentioned characteristics, insulation can be maintained (i.e., the insulation restoration properties are ensured) even after a short circuit, and generation of heat from the element body after the short circuit can be prevented. Although reasons why such insulation restoration properties are ensured are not necessarily clear, the reasons may be as follows.

In multilayer ceramic capacitors, internal electrode layers being adjacent to each other via ceramic layers may be short-circuited by externally applied mechanical stress or high voltage. In particular, when the ceramic layers have a thickness as thin as m or less, such a short circuit readily occurs. Because resistance of a conventional multilayer ceramic capacitor is reduced by a short circuit of the internal electrode layers having different polarities, applying a current to the short-circuited conventional multilayer ceramic capacitor may generate heat from its element body 4.

Figure 3:
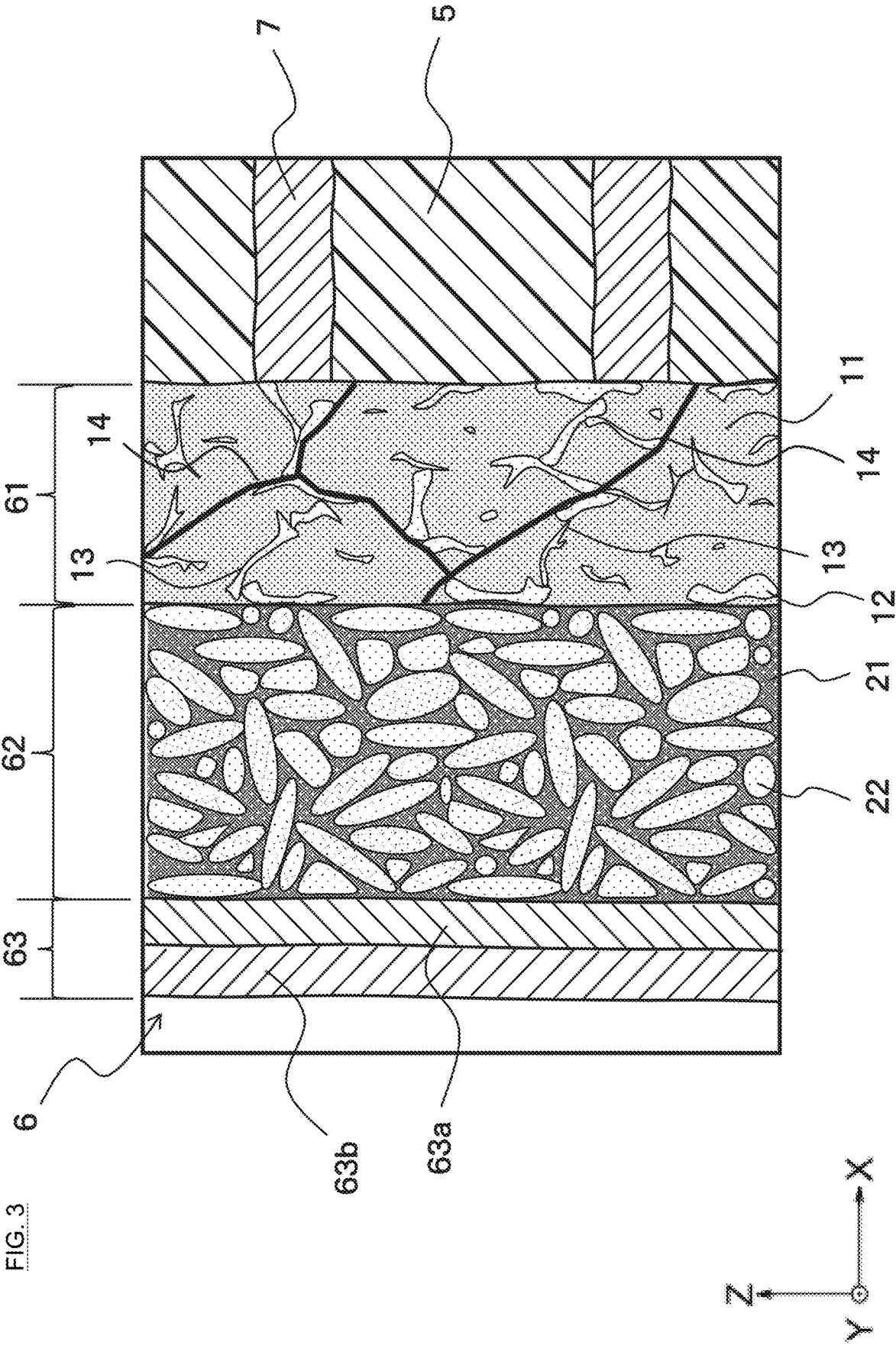
FIG. 3 is a sectional schematic view of the external electrode 6 in which a short circuit has occurred.

In the multilayer ceramic capacitor 2 of the present embodiment, it is assumed that, as shown in FIG. 3, energization after a short circuit causes the cracks 14 in the first layer 61, and the conductive paths 13 included in the first layer 61 are cut by the cracks 14. It is assumed that cutting of the conductive paths 13 increases again the resistance that has decreased after the short circuit (i.e., insulation of the multilayer ceramic capacitor 2 is restored). Thus, generation of heat from the element body of the multilayer ceramic capacitor 2 can be prevented even when the short circuit occurs.

As described above, the multilayer structure, which includes the first layer 61 and the second layer 62, of the external electrodes 6 of the multilayer ceramic capacitor 2 contributes to exhibition of the insulation restoration properties; and the internal structure (e.g., components of the ceramic layers 5 and the internal electrode layers 7) of the element body 4 can be appropriately controlled in accordance with desired dielectric properties. In other words, while degree of freedom in designing the element body 4 is ensured, the multilayer ceramic capacitor 2 can have the insulation restoration properties after a short circuit.

When the average aspect ratio of the first metal phases 12 is 3.5 or more and less than 5.0, the area ratio AM1 of the first metal phases 12 in the first layer 61 is preferably more than 8% and 18% or less. When the average aspect ratio of the first metal phases 12 is 5.0 or more, the area ratio AM1 of the first metal phases 12 is preferably more than 6% and 18% or less. Setting the area ratio AM1 within the above-mentioned favorable ranges allows the multilayer ceramic capacitor 2 to have sufficient initial capacitance and have further improved insulation restoration properties after a short circuit. That is, setting the area ratio AM1 to 18% or less causes the conductive paths 13 to be more readily cut and insulation resistance to more readily increase at the time of energization after the short circuit.

The average thickness $t1_{Ave}$ of the first layer 61 of the multilayer ceramic capacitor 2 of the present embodiment is preferably 20 μm or more. The ratio of the average major diameter $LD_{Ave}$ of the first metal phases 12 to the average thickness $t1_{Ave}$ of the first layer 61 is preferably 0.1 or more and 0.7 or less. Controlling $t1_{Ave}$ and $LD_{Ave}$ of the first layer 61 in the above-mentioned manner allows the insulation restoration properties after the short circuit to be further improved.

The first insulator phase 11 of the first layer 61 preferably includes an oxide containing boron and more preferably includes a boron based complex oxide. When the first insulator phase 11 is made of a boron based complex oxide, the first insulator phase 11 has characteristics more fragile than those of crystalline oxides (or complex oxides), and energization after the short circuit more readily causes the cracks 14 (i.e., the conductive paths 13 in the first layer 61 are more readily cut). Consequently, the insulation restoration properties are further improved.

Hereinbefore, an embodiment of the present disclosure has been described. However, the present invention is not limited to the above-mentioned embodiment and can be modified variously without departing from the gist of the present disclosure.

Although the multilayer ceramic capacitor 2 was given as an example of multilayer ceramic electronic devices in the present embodiment, a multilayer ceramic electronic device according to the present disclosure may be, for example, a bandpass filter, a multilayer three-terminal filter, a thermistor, or a piezoelectric element.

Although the ceramic layers 5 and the internal electrode layers 7 are laminated in the Z-axis direction in the present embodiment, they may be laminated in the X-axis direction or the Y-axis direction. In this case, the external electrodes 6 are formed in accordance with exposed surfaces of the internal electrode layers 7.

EXAMPLES

Hereinafter, the present disclosure will be described in more detail with examples, but the present invention is not limited to the examples.

Experiment 1

Example 1

First, an element body in which ceramic layers and Ni internal electrode layers were alternately laminated was manufactured by a sheet method. The main component of the ceramic layers was a dielectric compound represented by $(Ca_{0.7}Sr_{0.3})(Zr_{0.96}Ti_{0.04})O_3$. As a subcomponent of the ceramic layers, MnO, $SiO_2$, and $Al_2O_3$ were added. The ceramic layers had an average thickness of 2.5 μm. The Ni internal electrode layers had an average thickness of 1.1 μm. The number of the ceramic layers in a capacitance region was 257. The element body had a size of L0×W0×T0=3.2 mm×1.6 mm×1.6 mm.

Next, a low-specific-gravity sintered electrode layer (first layer 61) was formed on outer surfaces of the element body using a first conductive paste. To the first conductive paste, a Ag powder having an average aspect ratio of 3.5 or more and an average major diameter of 6.6 μm and glass frit (a boron based complex oxide) containing SrO, $Al_2O_3$, ZnO, $SiO_2$, and $B_2O_3$ were added. The mixing ratio of the Ag powder in the first conductive paste was adjusted so that the area ratio of metal phases in the low-specific-gravity sintered electrode layer after sintering was to be as shown in Table 1. The first conductive paste was applied to end surfaces of the element body by a dip coating method and dried. Then, the element body with the first conductive paste applied was heated at a holding temperature of 750° C. for a temperature holding time of 5 minutes to bake the first conductive paste to form the low-specific-gravity sintered electrode layer. In Example 1, the low-specific-gravity sintered electrode layer (first layer 61) had an average thickness of 25.5 μm.

Next, a resin electrode layer (second layer 62) was formed on the low-specific-gravity sintered electrode layer using a resin electrode paste. To the resin electrode paste, a Ag powder having an average particle size of 3 μm and an epoxy resin were added. The mixing ratio of the Ag powder in the resin electrode paste was adjusted so that the area ratio of metal phases in the resin electrode layer was to be as shown in Table 1. The resin electrode paste was applied so as to cover the low-specific-gravity sintered electrode layer using the dip coating method and dried. Then, the element body with the resin electrode paste applied was heated at a holding temperature of 220° C. for a temperature holding time of 1 hour to harden the epoxy resin included in the resin electrode paste to form the resin electrode layer. In Example 1, the resin electrode layer (second layer 62) had an average thickness of 31.1 μm.

After the resin electrode layer was formed, a Ni plating layer having an average thickness of 3.8 μm was formed on the resin electrode layer using an electrolytic plating method. A Sn plating layer having an average thickness of 4 μm was also formed on the Ni plating layer using the electrolytic plating method. The above process gave a multilayer ceramic capacitor according to Example 1.

Example 2

In Example 2, after a low-specific-gravity sintered electrode layer was formed on outer surfaces of an element body as in Example 1, a sintered electrode layer (second layer 62) was formed on the low-specific-gravity sintered electrode layer. Specifically, a sintered electrode paste to which a Cu powder having an average particle size of 3 μm and glass frit (a boron based complex oxide) containing SrO, $Al_2O_3$, ZnO, $SiO_2$, and $B_2O_3$ were added was prepared. The mixing ratio of the Cu powder in the sintered electrode paste was adjusted so that the area ratio of metal phases in the sintered electrode layer was to be as shown in Table 1. The sintered electrode paste was applied to the low-specific-gravity sintered electrode layer using the dip coating method and dried. Then, the element body was heated at a holding temperature of 750°

C. for a temperature holding time of 5 minutes to form the sintered electrode layer covering the low-specific-gravity sintered electrode layer.

On the sintered electrode layer, a Ni plating layer and a Sn plating layer were formed as in Example 1. A multilayer ceramic capacitor according to Example 2 was given as in Example 1 except that the sintered electrode layer was formed instead of the resin electrode layer as the second layer 62. In the capacitor sample of Example 2, the low-specific-gravity sintered electrode layer (first layer 61) had an average thickness of 25.3 μm; the sintered electrode layer (second layer 62) had an average thickness of 21.5 μm; and the Ni plating layer and the Sn plating layer had average thicknesses same as those of Example 1.

Example 3

In Example 3, a low-specific-gravity sintered electrode layer including Cu metal phases (first metal phases 12) was formed on outer surfaces of an element body. Specifically, a first conductive paste to which a Cu powder having an average aspect ratio of 3.5 or more and an average major diameter of 7.2 μm and glass frit (a boron based complex oxide) containing SrO, $Al_2O_3$, ZnO, $SiO_2$, and $B_2O_3$ were added was prepared. The mixing ratio of the Cu powder in the first conductive paste was adjusted so that the area ratio of the metal phases in the low-specific-gravity sintered electrode layer after sintering was to be as shown in Table 1. The first conductive paste including the Cu powder was baked as in Example 1 to form the low-specific-gravity sintered electrode layer in direct contact with the end surfaces of the element body.

In Example 3, similarly to Example 1, a resin electrode layer, a Ni plating layer, and a Sn plating layer were formed on the low-specific-gravity sintered electrode layer in the order mentioned. A multilayer ceramic capacitor according to Example 3 was given as in Example 1 except that the Cu powder was used instead of the Ag powder at the time of forming the low-specific-gravity sintered electrode layer. In the capacitor sample of Example 3, the low-specific-gravity sintered electrode layer had an average thickness of 23.1 μm; the resin electrode layer had an average thickness of 32.5 μm; and the Ni plating layer and the Sn plating layer had average thicknesses same as those of Example 1.

Comparative Example 1

In Comparative Example 1, external electrodes in each of which a resin electrode layer, a Ni plating layer, and a Sn plating layer were laminated in the order mentioned were formed on outer surfaces of an element body. That is, in Comparative Example 1, the resin electrode layer (second layer 62) was formed in direct contact with the end surfaces of the element body, without a low-specific-gravity sintered electrode layer (first layer 61) being formed. The resin electrode paste used in Comparative Example 1 was the same as that used in Example 1. To the resin electrode paste, the Ag powder having an average particle size of 3 μm and the epoxy resin were added.

A multilayer ceramic capacitor according to Comparative Example 1 was given as in Example 1 except that no low-specific-gravity sintered electrode layer was formed. In the capacitor sample of Comparative Example 1, the resin electrode layer had an average thickness of 31.4 μm; and the Ni plating layer and the Sn plating layer had average thicknesses same as those of Example 1.

Comparative Example 2

In Comparative Example 2, external electrodes in each of which a sintered electrode layer, a Ni plating layer, and a Sn plating layer were laminated in the order mentioned were formed on outer surfaces of an element body. That is, in Comparative Example 2, the sintered electrode layer (second layer 62) was formed in direct contact with the end surfaces of the element body, without a low-specific-gravity sintered electrode layer (first layer 61) being formed. The sintered electrode paste used in Comparative Example 2 was the same as that used in Example 2. To the sintered electrode paste, the Cu powder having an average particle size of 3 μm and the glass frit (boron based complex oxide) containing SrO, $Al_2O_3$, ZnO, $SiO_2$, and $B_2O_3$ were added.

A multilayer ceramic capacitor according to Comparative Example 2 was given as in Example 1 except that no low-specific-gravity sintered electrode layer was formed. In the capacitor sample of Comparative Example 2, the sintered electrode layer had an average thickness of 22.8 μm; and the Ni plating layer and the Sn plating layer had average thicknesses same as those of Example 1.

The following evaluation was carried out for each Example and each Comparative Example of Experiment 1.
External Electrode Analysis A cross section of the external electrodes was observed with a SEM to calculate the area ratios of the metal phases in the low-specific-gravity sintered electrode layer, the resin electrode layer, and the sintered electrode layer. In such analysis, the area ratios of the metal phases were calculated by analyzing three fields of view in a cross section of each layer at a magnification of 2,000× to 20,000×. Table 1 shows analysis results of each Example and each Comparative Example.

In the external electrode sectional observation using the SEM, the aspect ratios of the metal phases included in the low-specific-gravity sintered electrode layer were measured. The average aspect ratio of Example 1 was 4.6; the average aspect ratio of Example 2 was 4.5; and the average aspect ratio of Example 3 was 4.1.
Initial Capacitance Before an insulation restoration test (described later) was conducted, capacitance of the capacitor sample was measured. Specifically, capacitance was measured with an LCR meter at a measurement frequency of 1 kHz and a measurement voltage level of 1 Vrms. In each Example and each Comparative Example, capacitance of ten capacitor samples was measured, and their average was calculated as the initial capacitance (unit: nF). Samples were deemed good at an initial capacitance of 95 nF or more, and samples were deemed better at an initial capacitance of 100 nF or more.
Insulation Restoration Test The following test was conducted to evaluate insulation restoration properties after a short circuit. First, a high voltage of DC 1 kV was applied to the capacitor sample to forcibly cause a short circuit of the internal electrode layers in the element body. Ten samples ("short-circuited samples") that had a resistance of 10Ω or less after such high voltage application were prepared in each Example and each Comparative Example. Each short-circuited sample was connected to a DC stabilized power supply (voltage: 12 V, current: 6 A) for about 1 second. The sample was deemed "pass" when the resistance re-increased to 10 kΩ or more, and the sample was deemed "fail" when the resistance remained less than 10 kΩ after energization. The insulation restoration properties were represented by a ratio $(N_P/N_0)$ of the number of "pass" samples $(N_P)$ to the number of tested samples (No). Samples were deemed to have good insulation restoration properties at a $N_P/N_0$ ratio of 8/10 or more, and samples were deemed to have excellent insulation restoration properties at a $N_P/N_0$ ratio of 10/10. Table 1 shows the evaluation results.

TABLE 1

| | External electrode structure | | | | | |
| --- | --- | --- | --- | --- | --- | --- |
| | First layer | | | | | |
| Sample No. | Type | Metal phase | Insulator phase | Area ratio of metal phases (%) | Second layer Type | |
| Comp. Ex. 1 | Resin electrode layer | Ag | Epoxy resin | 85 | N/A | |
| Comp. Ex. 2 | Sintered electrode layer | Cu | Boron based complex oxide | 88 | N/A | |
| Ex. 1 | Low-specific-gravity sintered electrode layer | Ag | Boron based complex oxide | 16 | Resin electrode layer | |
| Ex. 2 | Low-specific-gravity sintered electrode layer | Ag | Boron based complex oxide | 14 | Sintered electrode layer | |
| Ex. 3 | Low-specific-gravity sintered electrode layer | Cu | Boron based complex oxide | 14 | Resin electrode layer | |

| | External electrode structure | | | | | |
| --- | --- | --- | --- | --- | --- | --- |
| | Second layer | | | | Evaluation results | |
| Sample No. | Metal phase | Insulator phase | Area ratio of metal phases (%) | Plating electrode layer | Initial capacitance (nF) | Insulation restoration properties |
| Comp. Ex. 1 | — | — | — | Ni plating Sn plating | 96.5 | 0/10 |
| Comp. Ex. 2 | — | — | — | Ni plating Sn plating | 101.5 | 0/10 |
| Ex. 1 | Ag | Epoxy resin | 85 | Ni plating Sn plating | 101.1 | 10/10 |
| Ex. 2 | Cu | Boron based complex oxide | 88 | Ni plating Sn plating | 100.5 | 10/10 |
| Ex. 3 | Ag | Epoxy resin | 85 | Ni plating Sn plating | 100.6 | 10/10 |

As shown in Table 1, in Comparative Examples 1 and 2 (in which the conventional external electrodes were formed), resistance remained low and insulation was not restored when the short-circuited capacitor samples were energized. In contrast, in Examples 1 to 3 (in which the low-specific-gravity sintered electrode layer (first layer 61) was included), resistance increased and insulation was restored when the short-circuited capacitor samples were energized. Also, in Examples 1 to 3, it was confirmed that the capacitor samples before the insulation restoration test had high initial capacitance.

In observation of the cross sections of the capacitor samples of Examples 1 to 3 (in which the insulation restoration properties were exhibited after a short circuit), it was confirmed that cracks were generated in the low-specific-gravity sintered electrode layer. It is assumed that, in Examples 1 to 3, these cracks cut conductive paths in the low-specific-gravity sintered electrode layer.

Experiment 2

In Experiment 2, the average aspect ratio and the area ratio of the metal phases in the low-specific-gravity sintered electrode layer were changed to manufacture multilayer ceramic capacitors shown in Tables 2 and 3. Specifically, in Example 4 and Comparative Example 3, a Ag powder having an aspect ratio different from that of the Ag powder of Examples of Experiment 1 was used to form the low-specific-gravity sintered electrode layer. In Comparative Examples 4 and 5 and Examples 5 to 9, the mixing ratio of the Ag powder in the first conductive paste was adjusted to control the area ratio of the metal phases in the low-specific-gravity sintered electrode layer as shown in Table 2. In Comparative Examples 4 and 5 and Examples 5 to 9, the Ag powder having an average aspect ratio of 4.0 to 4.7 as in Experiment 1 was used.

In Comparative Examples 6 and 7 and Examples 10 to 14, a Ag powder having an average aspect ratio of 5.0 or more was used to form the low-specific-gravity sintered electrode layer, and the area ratio of the metal phases in the low-specific-gravity sintered electrode layer was controlled as shown in Table 3.

In each Example and each Comparative Example of Experiment 2, a resin electrode layer was formed on the low-specific-gravity sintered electrode layer, and a Ni plating layer and a Sn plating layer were formed on the resin electrode layer. Except for the above, the multilayer ceramic capacitors were manufactured as in Example 1 of Experiment 1. That is, specifications of the element body, the resin electrode layer, and the plating layers of each Example and each Comparative Example of Experiment 2 were similar to those of Example 1 of Experiment 1.

Tables 2 and 3 show the evaluation results of Experiment 2. "ND" marked as results of evaluation of the insulation restoration properties in Tables 2 and 3 indicates that the insulation restoration test was not conducted. That is, in Comparative Examples marked with "ND", the insulation restoration test was not able to be conducted because the samples did not have capacitance required as capacitors.

TABLE 2

| Sample No. | Insulator phase | Metal phase | | | Average thickness (μm) | Evaluation results | |
|---|---|---|---|---|---|---|---|
| | | Component | Average aspect ratio (—) | Area ratio (%) | | Initial capacitance (nF) | Insulation restoration properties |
| Ex. 1 | Boron based complex oxide | Ag | 4.6 | 16.0 | 25.5 | 101.1 | 10/10 |
| Ex. 4 | Boron based complex oxide | Ag | 3.7 | 14.0 | 28.1 | 101.5 | 10/10 |
| Comp. Ex. 3 | Boron based complex oxide | Ag | 3.3 | 14.0 | 28.2 | 0.2 | ND |
| Comp. Ex. 4 | Boron based complex oxide | Ag | 4.2 | 8.0 | 22.5 | 0.1 | ND |
| Ex. 5 | Boron based complex oxide | Ag | 4.7 | 8.3 | 28.3 | 100.1 | 10/10 |
| Ex. 6 | Boron based complex oxide | Ag | 4.6 | 9.0 | 25.3 | 101.3 | 10/10 |
| Ex. 7 | Boron based complex oxide | Ag | 4.5 | 11.0 | 27.9 | 101.0 | 10/10 |
| Ex. 8 | Boron based complex oxide | Ag | 4.2 | 18.0 | 26.5 | 100.8 | 10/10 |
| Ex. 9 | Boron based complex oxide | Ag | 4.7 | 29.0 | 23.2 | 101.1 | 9/10 |
| Comp. Ex. 5 | Boron based complex oxide | Ag | 4.5 | 33.0 | 26.9 | 101.0 | 3/10 |

TABLE 3

| Sample No. | Insulator phase | Metal phase | | | Average thickness (μm) | Evaluation results | |
|---|---|---|---|---|---|---|---|
| | | Component | Average aspect ratio (—) | Area ratio (%) | | Initial capacitance (nF) | Insulation restoration properties |
| Comp. Ex. 6 | Boron based complex oxide | Ag | 5.1 | 6.0 | 23.1 | 0.1 | ND |
| Ex. 10 | Boron based complex oxide | Ag | 5.4 | 7.0 | 26.7 | 100.3 | 10/10 |
| Ex. 11 | Boron based complex oxide | Ag | 5.5 | 8.0 | 22.5 | 101.4 | 10/10 |
| Ex. 12 | Boron based complex oxide | Ag | 5.3 | 9.0 | 28.0 | 101.3 | 10/10 |
| Ex. 13 | Boron based complex oxide | Ag | 5.1 | 18.0 | 23.9 | 101.1 | 10/10 |
| Ex. 14 | Boron based complex oxide | Ag | 5.3 | 29.0 | 26.2 | 100.9 | 8/10 |
| Comp. Ex. 7 | Boron based complex oxide | Ag | 5.2 | 32.1 | 24.4 | 101.2 | 2/10 |

As shown in Table 2, in Comparative Example 3, the average aspect ratio of the metal phases in the low-specific-gravity sintered electrode layer was less than 3.5, and the initial capacitance was 0.2 nF. It is assumed that, in Comparative Example 3, the conductive paths were not sufficiently formed in the low-specific-gravity sintered electrode layer, and the samples were not able to have initial capacitance required as capacitors. In contrast, in Example 4 (in which the average aspect ratio of the metal phases was 3.7), the initial capacitance was 100 nF or more, and the samples of Example 4 were able to have initial capacitance required as capacitors. These results indicate that the average aspect ratio of the metal phases in the low-specific-gravity sintered electrode layer should be 3.5 or more.

In Comparative Example 4, the area ratio of the metal phases in the low-specific-gravity sintered electrode layer was 8.0%, and the initial capacitance was 0.1 nF. It is assumed that, in Comparative Example 4, the conductive paths were not sufficiently formed in the low-specific-gravity sintered electrode layer, and the samples of Comparative Example 4 were not able to have initial capacitance required as capacitors, because the area ratio of the metal phases was too low. In contrast, in Example 5 (in which the area ratio of the metal phases was 8.3%), the initial capacitance was 100 nF or more, and the samples of Example 5 were able to have initial capacitance required as capacitors. These results indicate that, when the average aspect ratio of the metal phases is 3.5 or more and less than 5.0, the area ratio of the metal phases in the low-specific-gravity sintered electrode layer should be more than 8.0%.

It is assumed that, as described above, the average aspect ratio and the area ratio of the metal phases in the low-specific-gravity sintered electrode layer are related to occurrence of percolation (i.e., formation of the conductive paths in the low-specific-gravity sintered electrode layer), and that the initial capacitance is dramatically increased by percolation.

The evaluation results shown in Table 3, in which the average aspect ratio of the metal phases in the low-specific-gravity sintered electrode layer was 5.0 or more, indicated that the lower limit of the area ratio of the metal phases required for percolation changed in accordance with the average aspect ratio of the metal phases. Specifically, sufficient initial capacitance was not provided at an area ratio of 8.0% in Comparative Example 4 (in which the average aspect ratio was less than 5.0%), whereas an initial capacitance of 100 nF or more was provided at an area ratio of 7.0% in Example 10 (in which the average aspect ratio was 5.0 or more). The results of Comparative Example 6 and Example 10 shown in Table 3 indicate that, when the average aspect ratio is 5.0 or more, the area ratio of the metal phases in the low-specific-gravity sintered electrode layer can be more than 6.0%.

In Comparative Examples 5 and 7 (in which the area ratio of the metal phases in the low-specific-gravity sintered electrode layer exceeded 30%), sufficient initial capacitance was able to be provided, but the probability of insulation restoration was 30% or less, which did not meet the criterion (8/10 or more) of the insulation restoration test. It is assumed that, in Comparative Examples 5 and 7, the content ratio of the metal phases in the low-specific-gravity sintered electrode layer was high, and the conductive paths were not sufficiently cut.

In contrast, in Examples 5 to 9 and 10 to 14, high initial capacitance and excellent insulation restoration properties were compatible. These results indicate that, to have satisfactory insulation restoration properties, the area ratio of the metal phases having an average aspect ratio of 3.5 or more should be 30% or less and preferably 18% or less in the low-specific-gravity sintered electrode layer.

Experiment 3

In Experiment 3, the average thickness of the low-specific-gravity sintered electrode layer was changed to manufacture multilayer ceramic capacitors shown in Table 4. The average thickness of the low-specific-gravity sintered electrode layer was controlled by adjusting conditions of the dip coating method. Except for the above, the multilayer ceramic capacitors according to Examples 21 to 23 were manufactured as in Example 1. Table 4 shows the evaluation results of Experiment 3.

TABLE 4

| Sample No. | Insulator phase | First layer structure | | | | Evaluation results | |
|---|---|---|---|---|---|---|---|
| | | Metal phase | | | | | |
| | | Component | Average aspect ratio (—) | Area ratio (%) | Average thickness (μm) | Initial capacitance (nF) | Insulation restoration properties |
| Ex. 1 | Boron based complex oxide | Ag | 4.6 | 16 | 25.5 | 101.1 | 10/10 |
| Ex. 21 | Boron based complex oxide | Ag | 4.6 | 14 | 20.5 | 100.7 | 10/10 |
| Ex. 22 | Boron based complex oxide | Ag | 4.3 | 14 | 15.4 | 101.3 | 9/10 |
| Ex. 23 | Boron based complex oxide | Ag | 4.4 | 16 | 9.1 | 100.1 | 8/10 |

As shown in Table 4, it was confirmed that the larger the thickness of the low-specific-gravity sintered electrode layer, the better the insulation restoration properties tended to be. It was revealed that the average thickness of the low-specific-gravity sintered electrode layer was preferably 15 μm or more and more preferably 20 μm or more.

Experiment 4

In Experiment 4, the average major diameter of the Ag powder added to the first conductive paste was changed to manufacture multilayer ceramic capacitors according to Examples 31 to 34. In particular, in Experiment 4, the particle size of the Ag powder and the amount of the first conductive paste applied were adjusted so that the ratio ($LD_{Ave}/t1_{Ave}$) of the average major diameter $LD_{Ave}$ of the metal phases (first metal phases 12) to the average thickness $t1_{Ave}$ of the low-specific-gravity sintered electrode layer was to be as shown in Table 5. Other manufacturing conditions were the same as in Example 1. Table 5 shows the evaluation results of Experiment 4.

TABLE 5

| | | First layer structure | | | | | | Evaluation results | |
| | | Metal phase | | | | | | | |
| Sample No. | Insulator phase | Component | Average aspect ratio (—) | Average major diameter (μm) | Area ratio (%) | Average thickness (μm) | $LD_{Ave}/t1_{Ave}$ (—) | Initial capacitance (nF) | Insulation restoration properties |
|---|---|---|---|---|---|---|---|---|---|
| Ex. 31 | Boron based complex oxide | Ag | 4.3 | 2.3 | 14 | 23.9 | 0.096 | 97.1 | 10/10 |
| Ex. 32 | Boron based complex oxide | Ag | 4.3 | 5.2 | 16 | 28.7 | 0.181 | 100.6 | 10/10 |
| Ex. 1 | Boron based complex oxide | Ag | 4.6 | 6.6 | 16 | 25.5 | 0.259 | 101.1 | 10/10 |
| Ex. 33 | Boron based complex oxide | Ag | 4.4 | 10.2 | 14 | 22.4 | 0.455 | 100.7 | 10/10 |
| Ex. 34 | Boron based complex oxide | Ag | 4.6 | 16.2 | 15 | 22.1 | 0.733 | 100.7 | 9/10 |

In Examples 32, 1, and 33, high initial capacitance and excellent insulation restoration properties were more favorably compatible among Examples shown in Table 5. These results indicate that the average major diameter of the metal phases (first metal phases 12) in the low-specific-gravity sintered electrode layer is preferably 5 μm or more and 15 μm or less, and that $LD_{Ave}/t1_{Ave}$ in the low-specific-gravity sintered electrode layer is preferably 0.1 or more and 0.7 or less.

REFERENCE NUMERALS

2 . . . multilayer ceramic capacitor
4 . . . element body
4a . . . end surface
4b . . . side surface
5 . . . ceramic layer
7 . . . internal electrode layer
6 . . . external electrode
61 . . . first layer (low-specific-gravity sintered electrode layer)
11 . . . first insulator phase
12 . . . first metal phase
13 . . . conductive path
14 . . . crack
62 . . . second layer
21 . . . second insulator phase
22 . . . second metal phase
63 . . . plating electrode layer
63a . . . Ni plating layer
63b . . . Sn plating layer

What is claimed is:

1. A multilayer ceramic electronic device comprising:
an element body including a ceramic layer and an internal electrode layer; and
an external electrode formed on an outer surface of the element body and electrically connected to part of the internal electrode layer,
wherein
the external electrode includes
a first layer in direct contact with the element body and containing a first insulator phase and first metal phases, and
a second layer in contact with an outer surface of the first layer and containing a second insulator phase and second metal phases;
an area ratio of the first metal phases in the first layer is more than 8% and 30% or less;

an area ratio of the second metal phases in the second layer is larger than the area ratio of the first metal phases in the first layer;
the first metal phases have an average aspect ratio of 3.5 or more, and
the first metal phases are not spherical particles.

2. The multilayer ceramic electronic device according to claim 1, wherein the area ratio of the first metal phases in the first layer is more than 8% and 18% or less.

3. The multilayer ceramic electronic device according to claim 1, wherein the first layer has an average thickness of 20 μm or more.

4. The multilayer ceramic electronic device according to claim 1, wherein a ratio of an average major diameter of the first metal phases to an average thickness of the first layer is 0.1 or more and 0.7 or less.

5. The multilayer ceramic electronic device according to claim 1, wherein the first insulator phase comprises an oxide containing boron.

6. The multilayer ceramic electronic device according to claim 1, wherein the first metal phases comprise copper or silver.

7. The multilayer ceramic electronic device according to claim 1, wherein the external electrode further comprises a plating electrode layer in contact with the second layer.

8. A multilayer ceramic electronic device comprising:
an element body including a ceramic layer and an internal electrode layer; and
an external electrode formed on an outer surface of the element body and electrically connected to part of the internal electrode layer,
wherein
the external electrode includes
a first layer in direct contact with the element body and containing a first insulator phase and first metal phases, and
a second layer in contact with an outer surface of the first layer and containing a second insulator phase and second metal phases;
an area ratio of the first metal phases in the first layer is more than 6% and 30% or less;
an area ratio of the second metal phases in the second layer is larger than the area ratio of the first metal phases in the first layer;
the first metal phases have an average aspect ratio of 5.0 or more, and
the first metal phases are not spherical particles.

9. The multilayer ceramic electronic device according to claim 1, wherein the first metal phases have an average aspect ratio of 4.0 or more.

* * * * *